United States Patent
Ogawa et al.

(10) Patent No.: US 12,481,374 B2
(45) Date of Patent: Nov. 25, 2025

(54) INFORMATION PROCESSING DEVICE FOR SIMULTANEOUSLY ADJUSTING SENSITIVITY AND DEAD ZONE OF A CONTROLLER

(71) Applicant: Sony Interactive Entertainment Inc., Tokyo (JP)

(72) Inventors: Tomohiro Ogawa, Tokyo (JP); Yoshiyuki Imada, Tokyo (JP); Toru Ogiso, Tokyo (JP); Jaewon Bae, Tokyo (JP); Tomomasa Mizuno, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/683,777

(22) PCT Filed: Sep. 5, 2022

(86) PCT No.: PCT/JP2022/033224
§ 371 (c)(1),
(2) Date: Feb. 15, 2024

(87) PCT Pub. No.: WO2023/037994
PCT Pub. Date: Mar. 16, 2023

(65) Prior Publication Data
US 2025/0123696 A1    Apr. 17, 2025

(30) Foreign Application Priority Data
Sep. 13, 2021    (JP) .................................. 2021-148362

(51) Int. Cl.
G06F 3/0338    (2013.01)
A63F 13/24     (2014.01)
G06F 3/02      (2006.01)

(52) U.S. Cl.
CPC ............ *G06F 3/0338* (2013.01); *A63F 13/24* (2014.09); *G06F 3/02* (2013.01)

(58) Field of Classification Search
None
See application file for complete search history.

(56) References Cited

U.S. PATENT DOCUMENTS

2011/0136568 A1*  6/2011  Buhr ...................... A63F 13/22
                                                    463/37
2019/0126140 A1*  5/2019  Nelson .................... A63F 13/20
(Continued)

FOREIGN PATENT DOCUMENTS

EP    3348311 A1       7/2018
JP    2003029922 A *   1/2003
(Continued)

OTHER PUBLICATIONS

International Search Report and Written Opinion mailed on Nov. 15, 2022, received for PCT Application PCT/JP2022/033224, filed on Sep. 5, 2022, 9 pages including English Translation.
(Continued)

*Primary Examiner* — Kirk W Hermann
(74) *Attorney, Agent, or Firm* — Fish & Richardson P.C.

(57) ABSTRACT

An information processing device includes an operation information acquisition section, a setting screen image generation section, and a display controlling section. The operation information acquisition section acquires operation information from a controller. The setting screen image generation section generates a setting screen image for the controller. The display controlling section causes a display device to display the setting screen image for the controller. The setting screen image for the controller includes an image that indicates both a sensitivity and a dead zone of an analog stick provided on the controller in a common scale.

20 Claims, 8 Drawing Sheets

(56) References Cited

U.S. PATENT DOCUMENTS

| | | | | |
|---|---|---|---|---|
| 2019/0126144 A1* | 5/2019 | Minamino | ............ | A63F 13/245 |
| 2019/0143202 A1* | 5/2019 | Oizumi | ................... | A63F 13/42 |
| | | | | 463/37 |
| 2019/0212832 A1* | 7/2019 | Kaech | ................... | G06F 3/0362 |

FOREIGN PATENT DOCUMENTS

| | | | |
|---|---|---|---|
| JP | 2014061225 A | * | 4/2014 |
| JP | 2018-110736 A | | 7/2018 |
| WO | 2019/089213 A1 | | 5/2019 |
| WO | 2019/139748 A1 | | 7/2019 |

OTHER PUBLICATIONS

Partial Supplementary European Search Report in European Appln. No. 22867316.6, mailed on Jul. 15, 2025, 15 pages.

* cited by examiner (a)

(b)

ID
INFORMATION PROCESSING DEVICE FOR SIMULTANEOUSLY ADJUSTING SENSITIVITY AND DEAD ZONE OF A CONTROLLER

CROSS-REFERENCE TO RELATED APPLICATIONS

The present application is based on International Patent Application No. PCT/JP2022/033224, filed Sep. 5, 2022, which claims priority from Japanese Patent Application No. 2021-148362, filed Sep. 13, 2021, the contents of each are hereby incorporated by reference.

TECHNICAL FIELD

The present invention relates to a technology for setting a controller.

BACKGROUND ART

In recent years, as a controller for allowing a user to input an operation when an application such as a game is played, a controller that includes an analog stick has become popular.

SUMMARY

Technical Problem

To an analog stick, a sensitivity that defines a magnitude of an operation amount to be recognized by a system with respect to an actual operation amount by a user and a dead zone in which an inputted operation is not accepted (also called "dead zone" or "margin") are set. Appropriate set values of the sensitivity and the dead zone of the analog stick are sometimes different among different applications of an operation target, or are sometimes different among users. Therefore, a mechanism for supporting the user such that the sensitivity and the dead zone of the analog stick can be adjusted appropriately by the user is demanded.

It is an object of the present invention to provide a technology for supporting a user in adjusting the sensitivity and the dead zone of an analog stick provided on a controller.

Solution to Problem

In order to solve the subject described above, an information processing device of an aspect of the present invention is an information processing device capable of accepting operation information from a controller, including a generation section that generates a setting screen image for the controller, and a display controlling section that causes a display device to display the setting screen image for the controller. The controller includes an analog stick. The setting screen image includes an image that indicates both a sensitivity and a dead zone of the analog stick in a common scale.

Another aspect of the present invention is an information processing device. This device is an information processing device capable of accepting operation information from a controller, including generation section that generates a setting screen image for the controller, and a display controlling section that causes a display device to display the setting screen image for the controller. The controller includes an analog stick. The setting screen image is configured such that both a sensitivity and a dead zone of the analog stick are adjustable simultaneously by a user.

A further aspect of the present invention is a controller. This controller is a controller that includes an analog stick, including a storage section that stores therein set values relating to a sensitivity and a dead zone of the analog stick, a first transmission section that transmits the set values relating to the sensitivity and the dead zone of the analog stick stored in the storage section to an external information processing device, a second transmission section that transmits operation information inputted to the analog stick to the information processing device, and an updating section that acquires the set values relating to the sensitivity and the dead zone of the analog stick and set on a setting screen image for the controller from the information processing device to update the set values stored in the storage section.

In addition, embodiments of the present invention effectively include any combination of the above-described components and any expressions of the present invention converted between a system, a method, a computer program, a recording medium in which the computer program is recorded, and the like.

According to the present invention, it is possible to support a user in adjusting the sensitivity and the dead zone of an analog stick provided on a controller.

Figure 2:
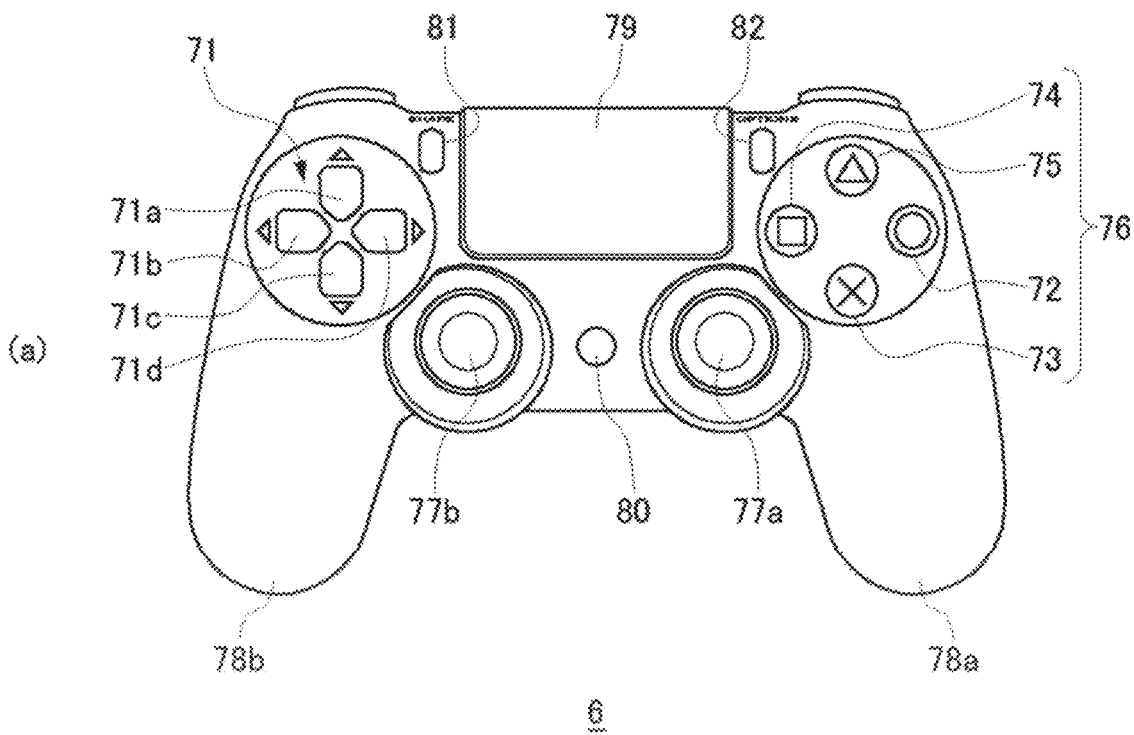
Figure 2:
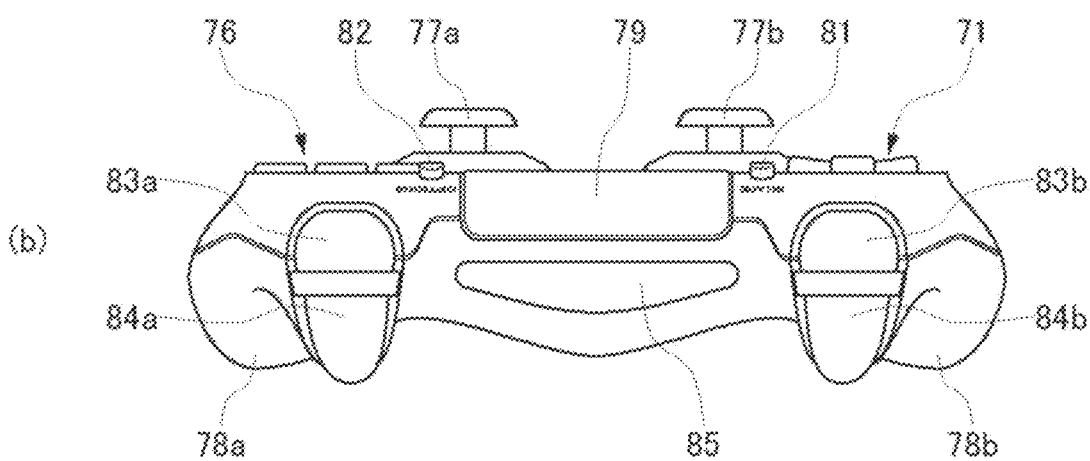

Part (a) of FIG. 2 is a view depicting an upper face of a game controller and Part (b) of FIG. 2 is a view depicting a back side face of the game controller.

Figure 3:
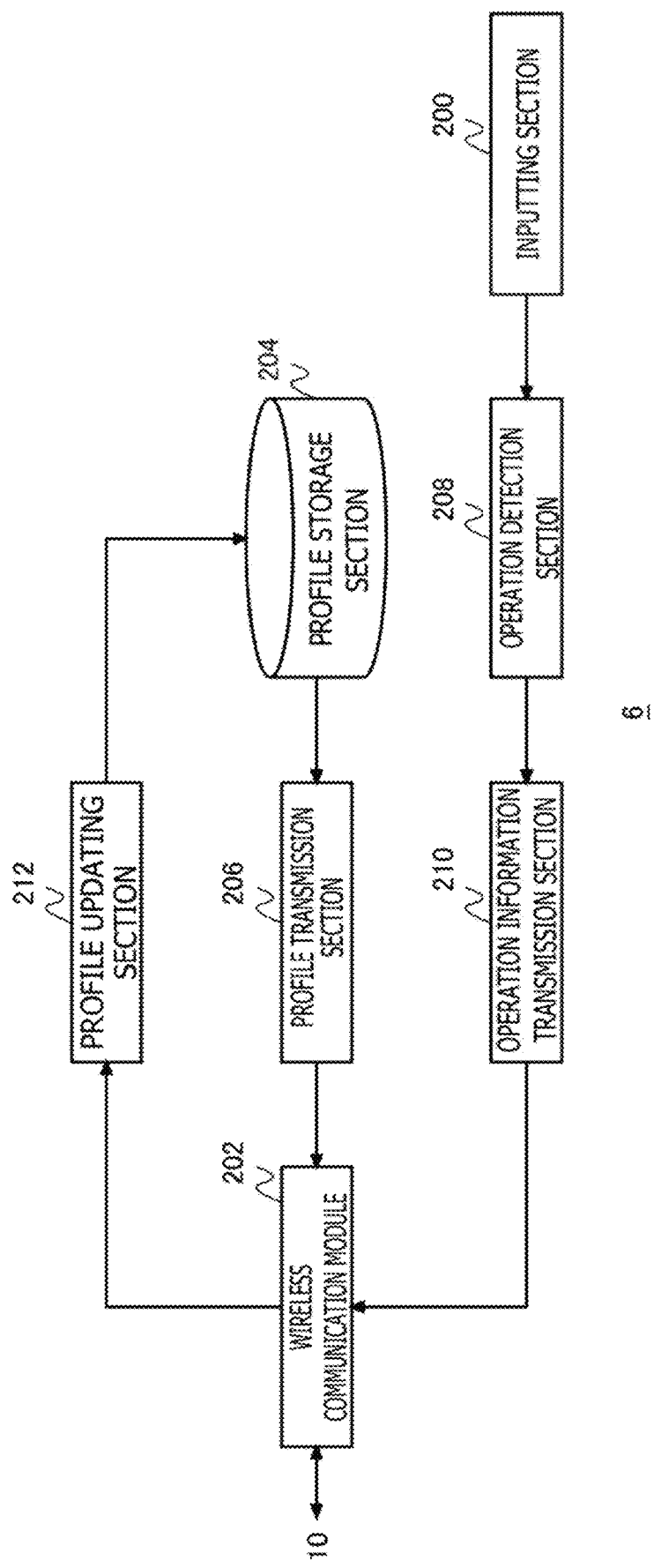

FIG. 3 is a block diagram depicting functional blocks of the controller.

Figure 4:
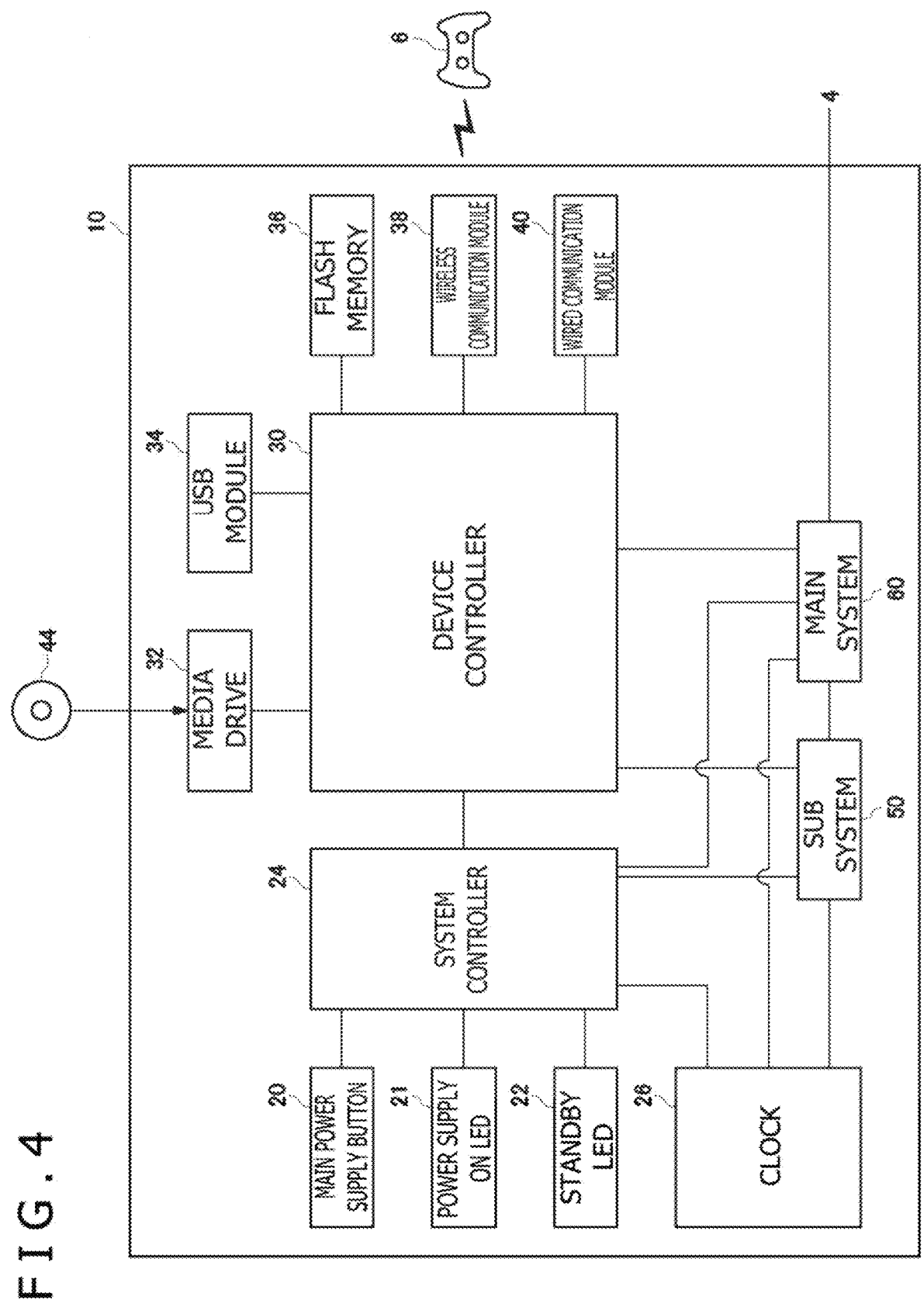

FIG. 4 is a block diagram depicting functional blocks of an information processing device.

Figure 5:
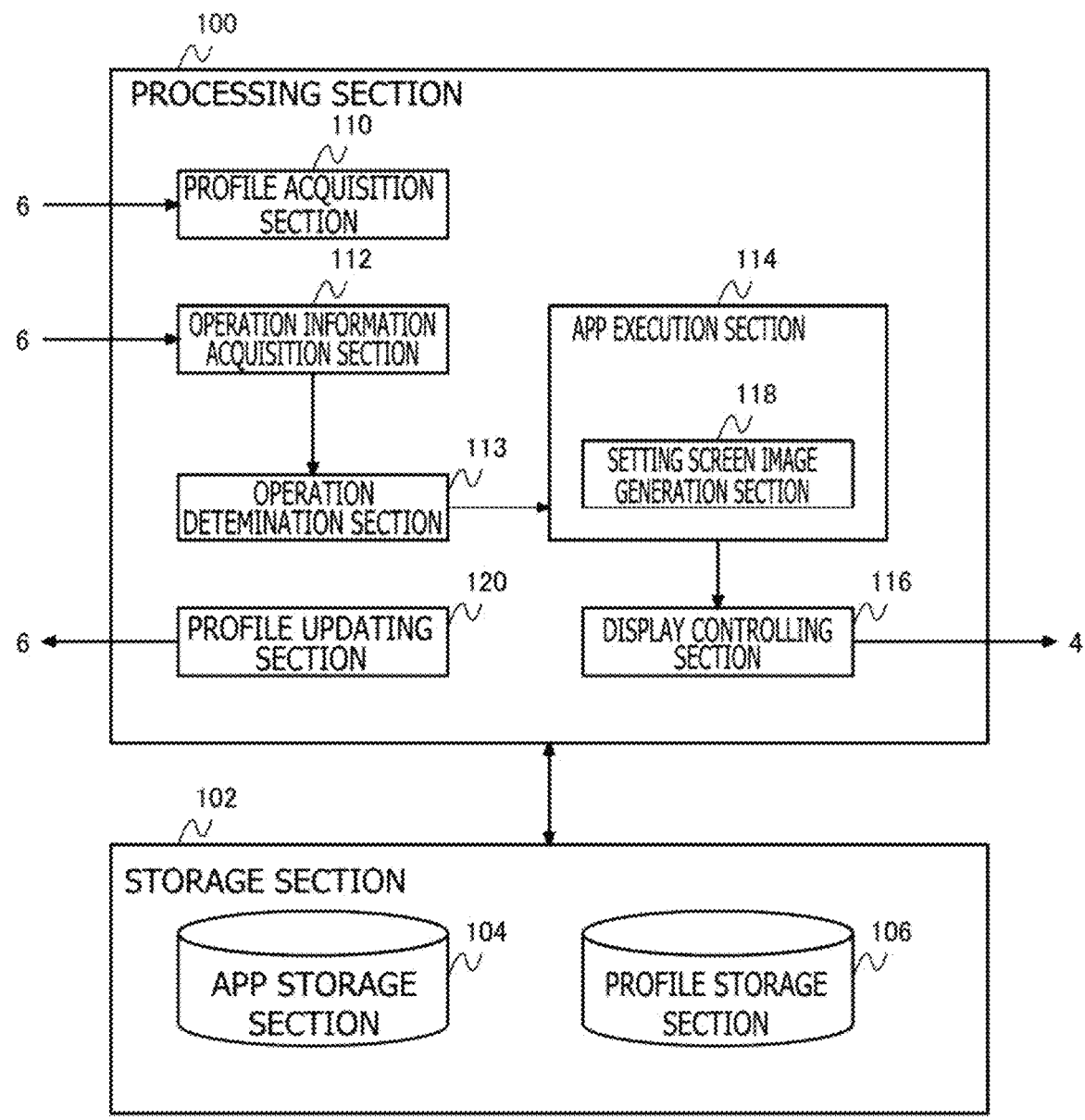

FIG. 5 is a block diagram depicting functional blocks of the information processing device.

Figure 6:
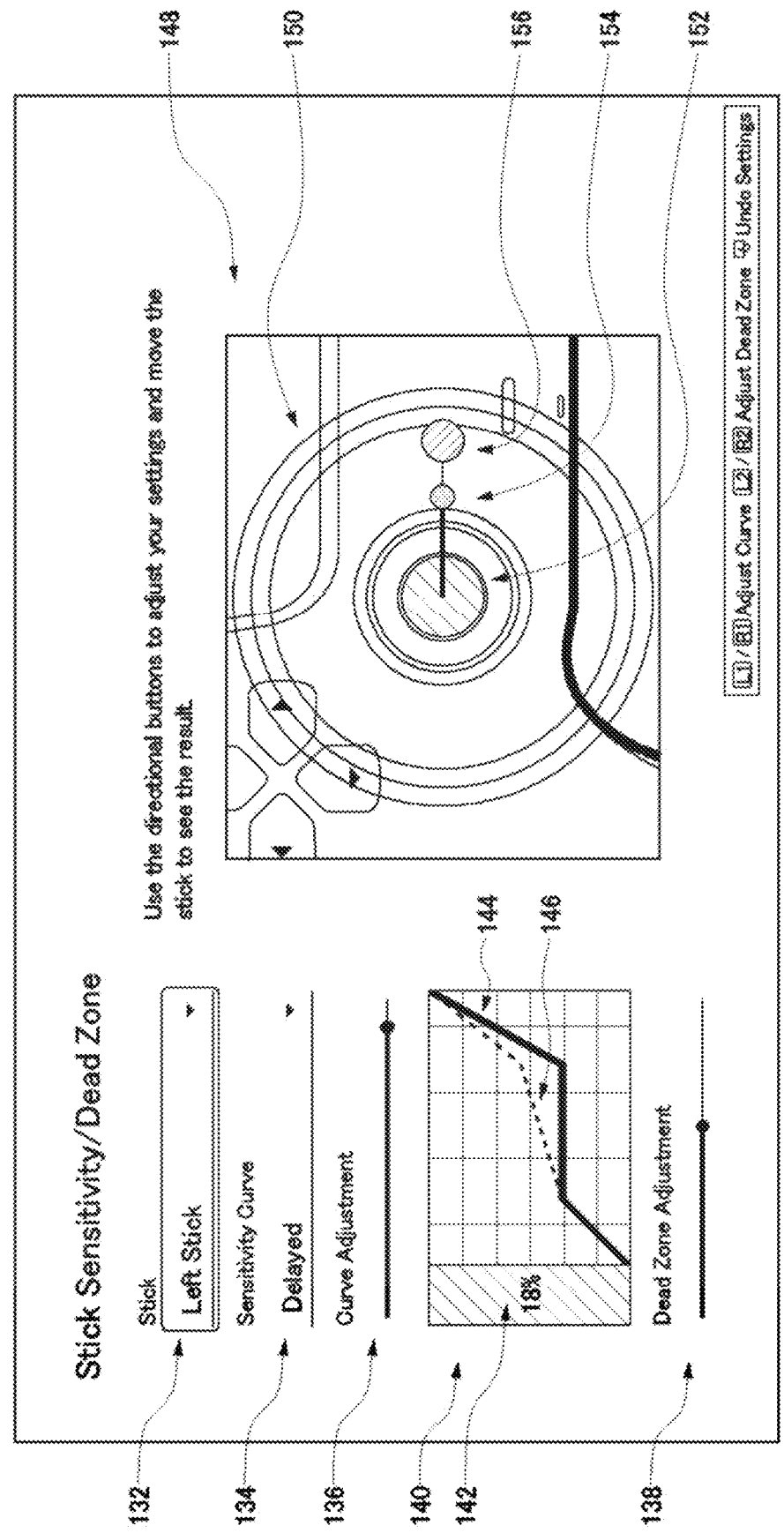

FIG. 6 is a view depicting an example of a controller setting screen image.

Figure 7:
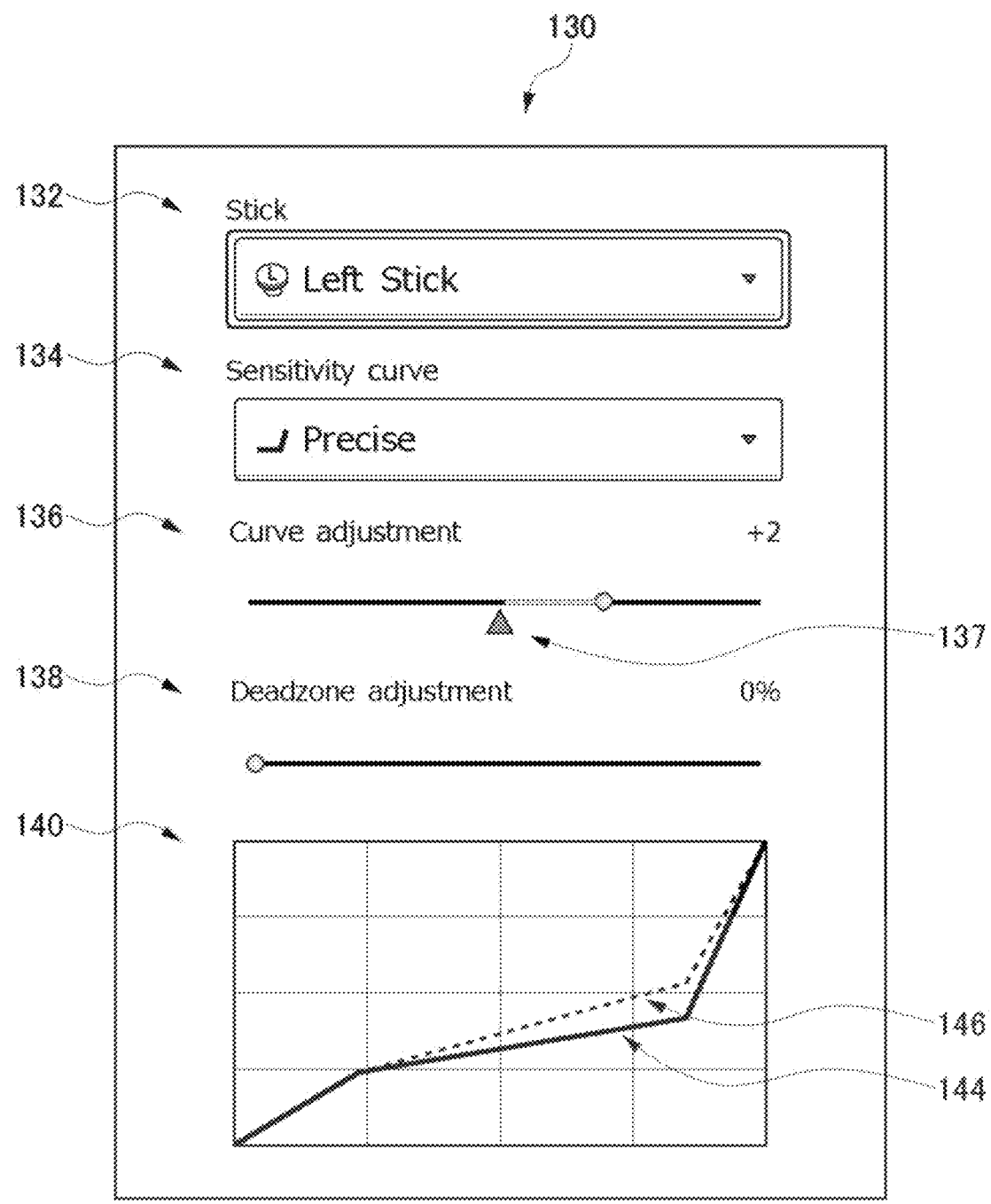

FIG. 7 is a view depicting an example of the controller setting screen image.

Figure 8:
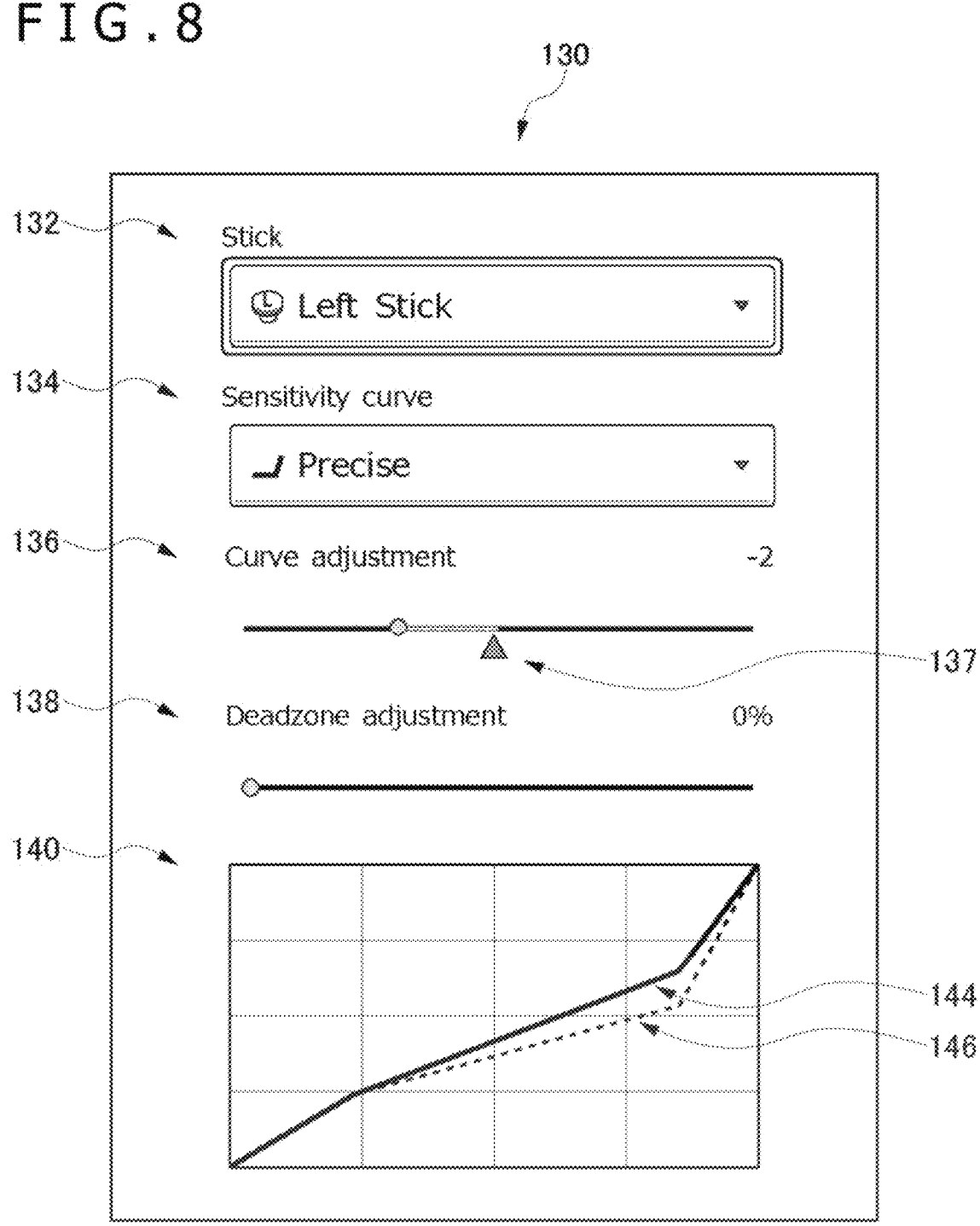

FIG. 8 is a view depicting an example of the controller setting screen image.

DESCRIPTION OF EMBODIMENTS

Figure 1:
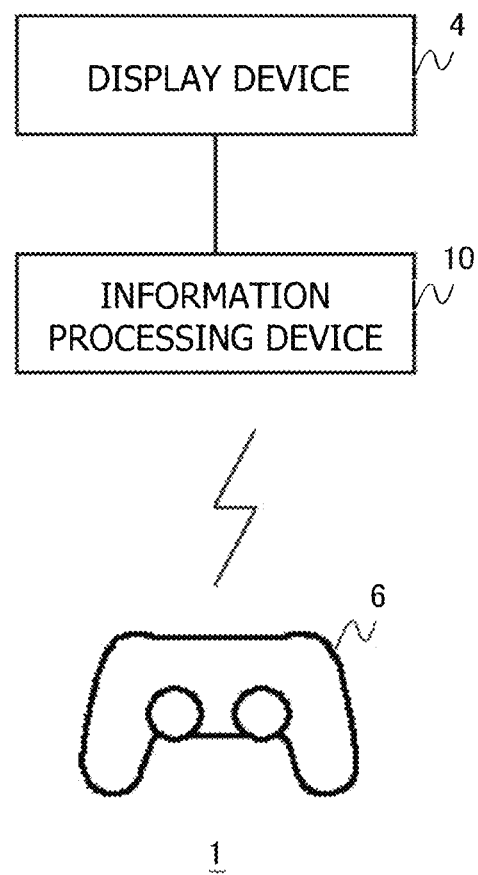
FIG. 1 is a view depicting an information processing system according to a working example of the present invention.

FIG. 1 depicts an information processing system 1 according to a working example of the present invention. The information processing system 1 includes an information processing device 10, a display device 4, and a controller 6. The information processing device 10 of the working example is a game device, for example, a stationary type game device. The information processing device 10 is connected to the controller 6 that is operated by a user in a wireless manner. The controller 6 is an inputting device to which the user inputs an operation. The controller 6 provides operation information indicative of the operation inputted by the user to the information processing device 10. The controller 6 can be regarded also as a game controller.

The display device 4 may be a television set that includes a display for outputting an image and a speaker for outputting sound or may be a computer display. The display device 4 may be connected to the information processing device 10 by a wired cable or may be connected in a wireless manner.

If the information processing device 10 accepts the operation information provided from the controller 6, it reflects the operation information on processing of system software or application software and causes the display device 4 to display an image relating to a result of the processing thereon.

A button configuration of the controller 6 is described.

<Configuration of Upper Face Portion>

Part (a) of FIG. 2 depicts an upper face of the controller 6. The user will operate the controller 6, gripping a left side gripping portion 78b with the left hand and gripping a right side gripping portion 78a with the right hand. On an upper face of a housing of the controller 6, directional buttons 71, a right analog stick 77a, a left analog stick 77b, and operation buttons 76 that are inputting sections are provided. The directional buttons 71 include an upper button 71a, a left button 71b, a lower button 71c, and a right button 71d. The four kinds of operation buttons 76 have different figures marked in different colors in order to distinguish from each other. In particular, a red circle is marked on a ○ button 72; a blue cross mark is marked on a x button 73; a purple square is marked on a □ button 74; and a green triangle is marked on a △ button 75.

The right analog stick 77a and the left analog stick 77b are also called control sticks or thumb sticks and are used to input a direction and a tilt amount by being tilted. The tilt amount can be regarded also as an angle by which the right analog stick 77a or the left analog stick 77b is tilted. The right analog stick 77a and the left analog stick 77b function also as depression type buttons that move down by being pushed by the user and that return to their original position by being released by the user. In the following description, the button function by pushing-in with use of the right analog stick 77a is referred to as an R3 button, and the button function by pushing-in with use of the left analog stick 77b is referred to as an L3 button.

On the upper face of the housing, a touch pad 79 is provided in a flat region between the directional buttons 71 and the operation buttons 76. The touch pad 79 functions also as a depression type button that moves down by being pushed by the user and that returns to its original position by being released by the user.

A home button 80 is provided between the right analog stick 77a and the left analog stick 77b. The home button 80 is used to turn on the power supply of the controller 6 to simultaneously activate a communication function for establishing wireless connection to the information processing device 10. After the controller 6 is connected to the information processing device 10, the home button 80 is used also to cause the information processing device 10 to display a menu screen image or a home screen image. The menu screen image or the home screen image is a screen image for allowing the user to select a function or an application that is to be executed by the information processing device 10.

A SHARE button 81 is provided on the left side of the touch pad 79. The SHARE button 81 is used to input an instruction from the user to the OS or system software in the information processing device 10. An OPTIONS button 82 is provided on the right side of the touch pad 79. The OPTIONS button 82 is used to input an instruction from the user to an application (game) executed in the information processing device 10. The SHARE button 81 and the OPTIONS button 82 may each be formed as a push type button.

<Configuration of Back Side Face Portion>

Part (b) of FIG. 2 depicts a back side face of the controller 6. On the upper side of a back side face of the housing of the controller 6, the touch pad 79 extends in a bent state from the upper face of the housing, and a transversely elongated light emission portion 85 is provided on the lower side of the back side face of the housing. The light emission portion 85 includes LEDs for red (R), green (G), and blue (B), which are lit according to light emission color information transmitted thereto from the information processing device 10. On the back side face of the housing, an R1 button 83a, an R2 button 84a, an L1 button 83b, and an L2 button 84b are provided at left and right positions symmetrical to each other in the longitudinal direction. The R1 button 83a and the R2 button 84a are operated by the forefinger and the middle finger of the right hand of the user, respectively, and the L1 button 83b and the L2 button 84b are operated by the forefinger and the middle finger of the left hand of the user, respectively. The R1 button 83a and the L1 button 83b on the upper side may each be configured as a push type button, and the R2 button 84a and the L2 button 84b on the lower side may each be configured as a trigger type button supported for pivotal motion.

The button configuration of the controller 6 is depicted in Part (a) of FIG. 2 and Part (b) of FIG. 2. The controller 6 includes various inputting sections (various types of buttons, sticks and so forth). The user will input an operation to the inputting sections of the controller 6 while viewing a menu screen image or a game screen image displayed on the display device 4.

FIG. 3 is a block diagram depicting functional blocks of the controller 6. The controller 6 includes an inputting section 200, a wireless communication module 202, a profile storage section 204, a profile transmission section 206, an operation detection section 208, an operation information transmission section 210, and a profile updating section 212.

Although the blocks depicted in the block diagram can be implemented by hardware such as elements of a computer, including a processor, a CPU (Central Processing Unit), and a memory, electronic circuits, and mechanical devices and can be implemented by software such as a computer program loaded into a memory, FIG. 3 depicts functional blocks implemented by cooperation of them. Accordingly, it is to be understood by those skilled in the art that these functional blocks can be implemented in various forms by hardware only, by software only, or by a combination of hardware and software. This similarly applies also to block diagrams described below.

The inputting section 200 includes the directional buttons 71, the right analog stick 77a, the left analog stick 77b, and the operation buttons 76 depicted in FIG. 2. In the following description, in a case where both the right analog stick 77a and the left analog stick 77b are collectively referred to, they are referred to as an "analog stick 77." The wireless communication module 202 performs wireless communication with the information processing device 10, by use of a known communication protocol such as the Bluetooth (registered trademark) protocol or the IEEE 802.11 protocol.

The profile storage section 204 stores profile data including a plurality of kinds of set values relating to the controller 6. The profile data includes (1) a profile ID, (2) data of function allocation to the buttons (button mapping data), (3) set values relating to the sensitivity of the right analog stick 77a and the left analog stick 77b, and (4) set values relating to the dead zone of the right analog stick 77a and the left analog stick 77b. The profile ID of (1) may be a user ID or may be an ID of the information processing device 10. The profile storage section 204 may store a plurality of pieces of profile data having profile IDs different from each other.

The sensitivity of (3) defines a magnitude of an operation recognized by the information processing device 10 with respect to the magnitude of an operation inputted actually to the analog stick 77 by the user (in other words, a tilt amount). The magnitude of the operation recognized by the information processing device 10 can be regarded also as a magnitude of the operation inputted to data processing in the information processing device 10. The set value of the sensitivity may be a ratio between the operation amount actually inputted to the analog stick 77 and the operation amount recognized by the information processing device 10, and this ratio may change depending upon the value of the operation amount actually inputted to the analog stick 77. The dead zone of (4) is a range within which the operation inputted to the analog stick 77 is not accepted and, in other words, is a range within which the operation inputted to the analog stick 77 is ignored. The set value of the dead zone may be a value range of the tilt amount corresponding to the dead zone.

The profile transmission section 206 transmits the profile data stored in the profile storage section 204 to the information processing device 10 through the wireless communication module 202.

The operation detection section 208 detects the operation inputted to the inputting section 200. The operation information transmission section 210 transmits operation information relating to the operation inputted to the inputting section 200 to the information processing device 10 through the wireless communication module 202. In a case where an operation for the analog stick 77 is inputted, the operation detection section 208 detects a direction (tilt direction) and a tilt amount (analog amount) in which the analog stick 77 is tilted, and the operation information transmission section 210 transmits operation information including the tilt direction and the tilt amount of the analog stick 77 to the information processing device 10.

The profile updating section 212 acquires profile data which has been transmitted from the information processing device 10 and includes set values relating to the sensitivity and the dead zone of the analog stick 77 set on a setting screen image for the controller 6 by the user, through the wireless communication module 202. The profile updating section 212 updates the profile data stored in the profile storage section 204 (for example, the set values relating to the sensitivity and the dead zone of the analog stick 77) on the basis of the profile data transmitted from the information processing device 10.

FIG. 4 is a block diagram depicting functional blocks of the information processing device 10. FIG. 4 principally depicts a hardware configuration of the information processing device 10. The information processing device 10 includes a main power supply button 20, a power supply ON LED 21, a standby LED 22, a system controller 24, a clock 26, a device controller 30, a media drive 32, a USB module 34, a flash memory 36, a wireless communication module 38, a wired communication module 40, a sub system 50, and a main system 60.

The main system 60 includes a main CPU, a memory that is a main storage device, a memory controller, a GPU (Graphics Processing Unit), and so forth. The GPU is used principally in arithmetic processing of a game program. The functions may be configured as a system-on-chip and formed on a single chip. The main CPU activates the OS and has a function for executing an application installed in a storage section (for example, the flash memory 36 or an auxiliary storage device not depicted) in an environment provided by the OS. The main system 60 further has a function of controlling display contents of the display device 4.

The sub system 50 includes a sub CPU, a memory that is a main storage device, a memory controller, and so forth but does not include a GPU. The number of circuit gates of the sub CPU is smaller than that of the main CPU, and the operating power consumption of the sub CPU is lower than that of the main CPU. The sub CPU operates while the main CPU is in a standby state and is limited in its processing function such that the power consumption is suppressed low. It is to be noted that the sub CPU and the memory may be formed on chips separate from each other.

The main power supply button 20 is an inputting section to which an operation input from the user is performed, and is provided on a front face of the housing of the information processing device 10 and is operated in order to turn on or off the power supply to the main system 60 of the information processing device 10. In the following description, a state that the main power supply is in an on state represents a state that the main system 60 is in an active state, and a state that the main power supply is in an off state represents a state that the main system 60 is in a standby state. The power supply ON LED 21 is lit when the main power supply button 20 is turned on, and the standby LED 22 is lit when the main power supply button 20 is turned off.

The system controller 24 detects depression of the main power supply button 20 by the user. If the main power supply button 20 is depressed when the main power supply is in an off state, then the system controller 24 acquires the depression operation as an "on instruction," but if the main power supply button 20 is depressed when the main power supply is in an on state, then the system controller 24 acquires the depression operation as an "off instruction."

While the main CPU has a function of executing a game program installed in a predetermined storage section or a ROM medium 44, the sub CPU does not have the function. However, the sub CPU has a function of accessing the storage section and a function of transmitting and receiving data to and from an external device. The sub CPU has only processing functions restricted in this manner and accordingly can operate with lower power consumption than that of the main CPU. The functions of the sub CPU are executed when the main CPU is in a standby state.

The clock 26 is a real time clock and generates current date and time information and supplies the generated current date and time information to the system controller 24, the sub system 50, and the main system 60.

The device controller 30 is configured as an LSI (Large-Scale Integrated Circuit) that executes delivery of information between devices like a south bridge. As depicted in FIG. 4, to the device controller 30, such devices as the system controller 24, the media drive 32, the USB module 34, the flash memory 36, the wireless communication module 38, the wired communication module 40, the sub system 50, and the main system 60 are connected. The device controller 30 controls the timing of data transfer absorbing a difference in electric characteristic and a difference in data transfer rate between the devices.

The media drive 32 is a drive device which is loaded with and drives the ROM medium 44 on which application software such as a game and license information are recorded, and reads a program, data, and the like from the ROM medium 44. The ROM medium 44 is a read-only recording medium such as an optical disc, a magneto-optical disc, or a Blu-ray disc.

The USB module 34 is a module that is connected to external equipment by a USB cable. The flash memory 36 is an auxiliary storage device that configures an internal storage. The wireless communication module 38 performs wireless communication, for example, with the controller 6 by a communication protocol such as the Bluetooth protocol or the IEEE 802.11 protocol. The wired communication module 40 performs wired communication with external equipment and is connected to the Internet, a server, or the like, for example, through an access point not detected.

FIG. 5 is also a block diagram depicting functional blocks of the information processing device 10. FIG. 5 principally depicts a software configuration of the information processing device 10. The information processing device 10 includes a processing section 100 and a storage section 102. The processing section 100 executes various types of signal processing. The processing section 100 may be implemented by a CPU or a GPU of the main system 60 depicted in FIG. 4. The storage section 102 stores data to be referred to or updated by the processing section 100. The storage section 102 may be implemented by a main memory of the main system 60 depicted in FIG. 4 or an auxiliary storage device such as the flash memory 36.

The storage section 102 includes an App storage section 104 and a profile storage section 106. The App storage section 104 stores various types of applications to be executed by the processing section 100 (App execution section 114). The applications in the working example include an application for setting the controller 6 (hereinafter referred to also as a "controller setting App"). The profile storage section 106 stores profile data of the controller 6. As described hereinabove, the profile data of the controller 6 includes a set value relating to the sensitivity of the controller 6 and a set value relating to the dead zone of the controller 6.

The processing section 100 includes a profile acquisition section 110, an operation information acquisition section 112, an operation determination section 113, the App execution section 114, a display controlling section 116, and a profile updating section 120. The App execution section 114 includes a setting screen image generation section 118. Functions of at least part of the plurality of functional blocks included in the processing section 100 may be incorporated in the controller setting App. The main system 60 (main CPU and so forth) of the controller 6 may demonstrate the functions of the functional blocks of the processing section 100 by reading out the controller setting App into the main memory and executing the controller setting App.

The profile acquisition section 110 acquires profile data transmitted from the controller 6 through the wireless communication module 38 depicted in FIG. 4. The profile acquisition section 110 stores the profile data transmitted thereto from the controller 6 into the profile storage section 106.

The operation information acquisition section 112 acquires operation information transmitted from the controller 6 through the wireless communication module 38 depicted in FIG. 4. The operation determination section 113 determinates a mode of the operation to be inputted to the system (App execution section 114) on the basis of the operation information acquired by the operation information acquisition section 112 and the profile data stored in the profile storage section 106. In other words, the operation determination section 113 adjusts the operation mode indicated by the operation information acquired by the operation information acquisition section 112 on the basis of the profile data to generate operation information indicative of the operation contents to be inputted to the system (App execution section 114) (such operation information is hereinafter referred to also as "adjustment operation information").

The App execution section 114 executes the application stored in the App storage section 104. Further, the App execution section 114 generates an execution result of the application that reflects the adjustment operation information inputted form the operation determination section 113. The display controlling section 116 outputs an image generated by the App execution section 114, namely, an image regarding the execution result of the application by the App execution section 114, to the display device 4, so that the image is displayed on the display device 4.

The setting screen image generation section 118 generates data of a screen image for setting of the controller 6 (hereinafter referred to as a "controller setting screen image"). The display controlling section 116 causes the display device 4 to display the controller setting screen image generated by the setting screen image generation section 118.

The profile updating section 120 stores profile data including various types of set values for the controller 6 set by the user on the controller setting screen image into the profile storage section 106. Further, the profile updating section 120 transmits profile data including the types of set values for the controller 6 set by the user on the controller setting screen image to the controller 6 through the wireless communication module 38 depicted in FIG. 4, so that the profile data is stored into the controller 6.

A basic action of the information processing system 1 having the configuration described above is described. If the power supply of the information processing device 10 and the controller 6 is switched from an off state to an on state, then the information processing device 10 and the controller 6 start wireless communication therebetween. When the wireless communication with the information processing device 10 is started, the profile transmission section 206 of the controller 6 transmits the profile data stored in the profile storage section 204 to the information processing device 10. The profile acquisition section 110 of the information processing device 10 acquires the profile data transmitted from the controller 6 and stores the profile data into the profile storage section 106.

The App execution section 114 of the information processing device 10 starts execution of the application (for example, a game program) stored in the App storage section 104 in response to a user operation to generate an image indicative of an execution result of the application. The display controlling section 116 of the information processing device 10 causes the display device 4 to display the image generated by the App execution section 114. It is to be noted that the image can be regarded as screen image data.

If the user operates the inputting section 200 of the controller 6, the operation detection section 208 of the controller 6 detects the inputted operation. The operation information transmission section 210 of the controller 6 transmits operation information indicative of the inputted operation to the information processing device 10. The operation information acquisition section 112 of the information processing device 10 acquires the operation information transmitted from the controller 6. The operation determination section 113 adjusts the operation information acquired by the operation information acquisition section 112 (namely, the operation information transmitted from the controller 6) on the basis of the profile data stored in the profile storage section 106 to generate adjustment operation information indicative of the operation contents to be inputted to the system.

As described hereinabove, the operation information of the analog stick 77 includes a tilt direction and a tilt amount of the analog stick 77. In a case where the tilt amount of the analog stick 77 remains within a range of the dead zone determined by the profile data, the operation determination section 113 determinates that an operation for the analog stick 77 is yet to be inputted and generates adjustment operation information indicating that an operation for the analog stick 77 is yet to be inputted.

Further, the operation determination section 113 derives a tilt amount for system input corresponding to the tilt amount indicated by the operation information on the basis of a sensitivity set value determined by the profile data and generates adjustment operation information indicative of the derived tilt amount for system input. In other words, the operation determination section 113 identifies the tilt amount for system input associated from the tilt amount indicated by the operation information on a sensitivity curve indicated by the profile data and generates adjustment operation information indicative of the identified tilt amount for system input. The operation determination section 113 inputs the generated adjustment operation information to the App execution section 114.

The App execution section 114 of the information processing device 10 generates an image indicative of an execution result of the application on which the adjustment operation information inputted from the operation determination section 113 is reflected (for example, a result obtained by causing a character to act on the basis of the adjustment operation information). The display controlling section 116 of the information processing device 10 causes the display device 4 to display the image generated by the App execution section 114.

Now, an action of the information processing system 1 in a case where setting of the controller 6 is performed is described.

The user will activate the controller setting App on the information processing device 10, and the App execution section 114 of the information processing device 10 starts execution of the controller setting App. The setting screen image generation section 118 of the App execution section 114 generates data for a controller setting screen image. The display controlling section 116 of the information processing device 10 outputs the data for the controller setting screen image to the display device 4, so that the controller setting screen image is displayed on the display device 4.

FIG. 6 depicts an example of the controller setting screen image. The controller setting screen image 130 of FIG. 6 indicates content for setting a sensitivity and a dead zone of the inputting section 200 (for example, the analog stick 77) of the controller 6. The controller setting screen image 130 includes a setting target selection field 132, a sensitivity pattern selection field 134, a sensitivity curve adjustment gauge 136, a dead zone adjustment gauge 138, a sensitivity curve image 140, and a setting state image 148.

The setting target selection field 132 is a screen image element for selecting an element of the inputting section 200 (for example, the directional button 71, the operation button 76, the right analog stick 77a, or the left analog stick 77b) to be set as a setting target on the controller setting screen image 130. In FIG. 6, the left analog stick 77b is selected. On the controller setting screen image 130 in the working example, it is possible to select an element of the inputting section 200 to be set as a setting target in a page for setting a sensitivity and a dead zone.

The sensitivity pattern selection field 134 is a screen image element for selecting a particular pattern from among a plurality of patterns for a sensitivity curve determined in advance. The sensitivity curve is a curve that associates a magnitude of an operation inputted to the analog stick 77 by the user (hereinafter referred to as a "user input operation amount") and a magnitude of the operation recognized in data processing of the information processing device 10 (hereinafter referred to as a "system recognition operation amount") with each other. The user input operation amount can be regarded also as an actual tilt amount or an actual tilt angle of the analog stick 77. Further, the system recognition operation amount can be regarded also as a tilt amount or a tilt angle of the analog stick 77 inputted in data processing of the information processing device 10 (in the working example, to the App execution section 114). It is to be noted that at least part of the sensitivity curve may be a linear line.

The plurality of patterns of a sensitivity curve may include linear, delay, and quick patterns. The linear pattern is a pattern in which the system recognition operation amount increases in proportion to an increase of the user input operation amount and is, for example, a pattern in which the inclination of the sensitivity curve is fixed. The delay pattern is a pattern in which the increase amount of the system recognition operation amount is moderate while the user input operation amount is small but, as the user input operation amount increases, also the system recognition operation amount increases greatly. The quick pattern is a pattern in which, even if the user input operation amount is small, the increase amount of the system recognition operation amount is so great that the system recognition operation amount reaches an upper limit in an early stage.

The sensitivity curve adjustment gauge 136 is a screen image element for adjusting the association relation of the user input operation amount of the analog stick 77 and the system recognition operation amount, and particularly is a screen image element for adjusting the inclination or the curvature of the sensitivity curve. The sensitivity curve adjustment gauge 136 includes a slider that suggests a value of the sensitivity of the analog stick 77. The dead zone adjustment gauge 138 is a screen image element for adjusting the range of the dead zone of the analog stick 77 (in other words, the magnitude of the dead zone). The dead zone adjustment gauge 138 includes a slider that suggests a value of the dead zone of the analog stick 77.

The controller setting screen image 130 includes two images that indicate both the sensitivity and the dead zone of the analog stick 77 with a common scale (in other words, with a common reference). One of the images is the sensitivity curve image 140 that indicates the sensitivity and the dead zone along an axis for the magnitude of an operation inputted to the analog stick 77 by the user. The other one of the images is the setting state image 148 that indicates the sensitivity and the dead zone with a distance from the center based on the magnitude of the operation inputted to the analog stick 77 by the user. The setting screen image generation section 118 disposes the sensitivity curve image 140 and the setting state image 148 on the controller setting screen image 130.

The sensitivity curve image 140 includes objects (an initial sensitivity curve 146 and an adjustment sensitivity curve 144) indicative of sensitivity curves disposed in a graph region in which the magnitude of the operation inputted to the analog stick 77 by the user is indicated on the axis of abscissa and the magnitude of the operation recognized by the information processing device 10 is indicated on the axis of ordinate. The initial sensitivity curve 146 indicates an initial value of the sensitivity curve defined by a pattern selected in the sensitivity pattern selection field 134. The adjustment sensitivity curve 144 indicates a sensitivity curve after adjustment by the sensitivity curve adjustment gauge 136. Further, the sensitivity curve image 140 includes an object (dead zone 142) indicative of the range of the dead zone disposed along the axis of abscissa in the graph region. The dead zone 142 in FIG. 6 indicates that 18% of the tilt amount that can be inputted by the user from a stationary position (in other words, an initial position) of the analog stick 77 is the dead zone.

The setting state image 148 includes an image indicative of the inputting section 200 of a setting target (in FIG. 6, the left analog stick 77b). Information relating to the sensitivity and the dead zone is superposed on the image. In particular, the setting state image 148 includes a plurality of concentric circles (level lines 150) that are centered at the stationary position (in other words, the initial position) of the analog stick 77) and indicate the magnitude of the operation from the stationary position in a plurality of stages. The plurality of level lines 150 may include three level lines 150 indicative of 100%, 75% and 50% of the maximum value of the magnitude of the operation determined as a reference. The level lines 150 can be regarded also as level contour lines regarding the magnitude of the operation.

On the setting state image 148, a first object (dead zone 152) indicative of the dead zone, a second object (input operation amount indicator 156) indicative of the magnitude of the operation inputted to the analog stick 77 by the user, and a third object (recognition operation amount indicator 154) indicative of the magnitude of the operation recognized by the information processing device 10 are disposed in a region including the plurality of level lines 150.

The dead zone 152 indicates a range of the dead zone by a distance from the stationary position of the analog stick 77, namely, from the center of the circles indicated by the level lines 150. The input operation amount indicator 156 indicates the magnitude of the operation inputted to the analog stick 77 by the user by a distance from the center, namely, indicates a user input operation amount.

The recognition operation amount indicator 154 indicates the magnitude of the operation recognized by the information processing device 10 by a distance from the center, namely, indicates a system recognition operation amount. Further, the input operation amount indicator 156 and the recognition operation amount indicator 154 indicate a tilt direction of the analog stick 77 by a direction along which a line extends from the center.

On the controller setting screen image 130, the user will first select a desired member to be set as a setting target from among a plurality of settable members included in the inputting section 200 of the controller 6 in the setting target selection field 132. Here, it is assumed that the user selects the left analog stick 77b. Then, the user selects a desired pattern from among a plurality of patterns of sensitivity curves determined in advance in the sensitivity pattern selection field 134. It is assumed here that the delay pattern is selected. The setting screen image generation section 118 disposes the initial sensitivity curve 146 determined with the delay pattern on the sensitivity curve image 140.

If the user tilts the left analog stick 77b of the controller 6, the setting screen image generation section 118 of the information processing device 10 sequentially updates the setting state image 148 in the controller setting screen image 130. In particular, the setting screen image generation section 118 disposes the input operation amount indicator 156 on the setting state image 148 according to a tilt direction and a tilt amount (namely, the user input operation amount) indicated by the operation information transmitted from the controller 6 and moves the input operation amount indicator 156 on the setting state image 148.

Further, the operation determination section 113 of the information processing device 10 adjusts the tilt amount indicated by the operation information transmitted from the controller 6 on the basis of the sensitivity curve (initial sensitivity curve 146) determined by the delay pattern. The setting screen image generation section 118 disposes the recognition operation amount indicator 154 on the setting state image 148 according to the tilt direction indicated by the operation information and the tilt amount after adjustment (namely, the system recognition operation amount) and moves the recognition operation amount indicator 154 on the setting state image 148.

For example, in a case where the user input operation amount is included in the dead zone, although the position of the input operation amount indicator 156 changes in response to the user operation, the position of the recognition operation amount indicator 154 does not change. On the other hand, in a case where the user input operation amount is within the range within which the inclination of the sensitivity curve is 0, the position of the input operation amount indicator 156 changes in response to the user operation, and the position of the recognition operation amount indicator 154 does not change.

The user adjusts the sensitivity curve and the dead zone of the left analog stick 77b such that the movement of the input operation amount indicator 156 and the movement of the recognition operation amount indicator 154 may become desired ones. The controller setting screen image 130 is configured such that both the sensitivity and the dead zone of the left analog stick 77b (also as in the right analog stick 77a) can be adjusted at the same time by the user. The same time signifies that the user intuitively feels that two events occur simultaneously and permits some time lag in processing of the information processing device 10. The controller setting screen image 130 in the working example is configured such that the sensitivity and the dead zone of the left analog stick 77b (also as in right analog stick 77a) can be adjusted at the same time without the necessity for the user to place the cursor at each setting item (for example, the sensitivity curve adjustment gauge 136 or the dead zone adjustment gauge 138).

In particular, the controller setting screen image 130 is configured such that the sensitivity and the dead zone of the left analog stick 77b (also as in right analog stick 77a) can be adjusted by buttons deployed adjacent to each other. In particular, the sensitivity of the left analog stick 77b can be adjusted by the L1 button 83b and the R1 button 83a. Every time the L1 button 83b is depressed, the setting screen image generation section 118 moves the sensitivity curve adjustment gauge 136 leftwardly and decreases the curvature of the sensitivity curve. On the other hand, every time the R1 button 83a is depressed, the setting screen image generation section 118 moves the sensitivity curve adjustment gauge 136 rightwardly and increases the curvature of the sensitivity curve. The setting screen image generation section 118 updates the sensitivity curve adjustment gauge 136 and the sensitivity curve image 140 (adjustment sensitivity curve 144) in response to a user operation of the L1 button 83b and the R1 button 83a.

Further, the dead zone of the left analog stick 77b can be adjusted by the L2 button 84b and the R2 button 84a. Every time the L2 button 84*b* is depressed, the setting screen image generation section 118 moves the dead zone adjustment gauge 138 leftwardly and decreases the range of the dead zone. On the other hand, every time the R2 button 84*a* is depressed, the setting screen image generation section 118 moves the dead zone adjustment gauge 138 rightwardly and increases the range of the dead zone. The setting screen image generation section 118 updates the dead zone adjustment gauge 138, the sensitivity curve image 140 (dead zone 142), and the setting state image 148 (dead zone 152) in response to a user operation of the L2 button 84*b* and the R2 button 84*a*.

If the user tilts the left analog stick 77*b* of the controller 6 after adjustment of the sensitivity curve and the dead zone, the movement of the recognition operation amount indicator 154 on the setting state image 148 is changed in response to the sensitivity curve and the dead zone after the adjustment. While the user adjusts the sensitivity curve by an operation of the L1 button 83*b* and the R1 button 83*a* and adjusts the dead zone by an operation of the L2 button 84*b* and the R2 button 84*a*, the user tilts the left analog stick 77*b* and confirms the movement of the input operation amount indicator 156 and the recognition operation amount indicator 154 to confirm whether or not a desired operation feeling is achieved.

The profile updating section 120 of the information processing device 10 sequentially stores, every time the settings (sensitivity curve and dead zone) of the controller 6 are updated in the controller setting screen image 130, profile data including the updated set value of the sensitivity curve and the updated set value of the dead zone. In particular, the profile updating section 120 stores an update history of the profile data into the profile storage section 106. In a case where, after transition from the controller setting screen image 130 (for example, a setting screen image for the sensitivity and the dead zone) to another screen image, the controller setting screen image 130 is displayed again, the setting screen image generation section 118 reads out the profile data and the latest profile data stored in the profile storage section 106 and reflects the set values (set values of the sensitivity curve and the dead zone) for the controller 6 recorded in the profile data on the controller setting screen image 130.

If a predetermined undo operation (for example, depression of the touch pad 79) is inputted on the controller setting screen image 130, the setting screen image generation section 118 reads out the profile data of the generation before the latest generation stored in the profile storage section 106 and reflects the set values for the controller 6 (set values of the sensitivity curve and the dead zone) recorded in the profile data on the controller setting screen image 130.

If the user confirms that a desired operation feeling is achieved in the controller setting screen image 130, the user inputs a predetermined storage operation. When the storage operation is inputted, the profile updating section 120 of the information processing device 10 transmits the latest profile data including the set value of the sensitivity curve and the set value of the dead zone (namely, the final set values by the user) at the time of inputting of the storage operation to the controller 6. The profile updating section 212 of the controller 6 stores the latest profile data transmitted from the information processing device 10 into the profile storage section 204. Consequently, also in a case where the controller 6 is connected to another information processing device 10 different from the information processing device 10 on which the setting work of the controller 6 has been performed, the settings of the controller 6 (the sensitivity curve, the dead zone, and so forth) indicated by the latest profile data can be inherited.

According to the information processing system 1 of the working example, the sensitivity curve image 140 and the setting state image 148 that intensively indicate both the sensitivity and the dead zone of the analog stick 77 are provided in the controller setting screen image 130. Consequently, it is possible to allow the user to intuitively recognize both the sensitivity and the dead zone of the analog stick 77 and to thereby support setting for the analog stick 77. For example, by disposing the dead zone 152 and the input operation amount indicator 156 on the setting state image 148, it is possible to allow the user to intuitively recognize the magnitude of the dead zone of the analog stick 77. Further, by further disposing the recognition operation amount indicator 154 on the setting state image 148, it is possible to allow the user to intuitively recognize the sensitivity of the analog stick 77.

Further, according to the information processing system 1, the controller setting screen image 130 is configured such that the user can adjust both the sensitivity and the dead zone for the analog stick 77 at the same time. Consequently, it becomes possible for the user to efficiently set both a sensitivity and a dead zone for the analog stick 77 and to thereby support setting of the analog stick 77. For example, by operating the analog stick 77 while the R1 button 83*a*, the L1 button 83*b*, the R2 button 84*a*, or the L2 button 84*b* is operated, the user can easily recognize a change in the sensitivity and the dead zone of the analog stick 77 on the controller setting screen image 130 (the setting state image 148 and so forth).

Furthermore, according to the information processing system 1, since the controller 6 acquires set values relating to the sensitivity and the dead zone for the analog stick 77 set on the controller setting screen image 130 from the information processing device 10 and stores the set values, even in a case where the environment (the information processing device 10 and so forth) in which the controller 6 is used changes, it is possible to reflect the set values relating to the sensitivity and the dead zone of the analog stick 77 set by the user.

The present invention has been described on the basis of the working example. The working example is exemplary, and it is to be understood by those skilled in the art that various modifications are possible in combination of the components and the processes and that also such modifications fall within the scope of the present invention.

Modifications will be described. As described above, the sensitivity adjustment of the analog stick 77 on the controller setting screen image 130 is implemented by adjusting the value suggested by the sensitivity curve adjustment gauge 136 (particularly, the position of the slider). The value suggested by the sensitivity curve adjustment gauge 136 can be adjusted by operating the R1 button 83*a* or the L1 button 83*b* or by operating the left button 71*b* or the right button 71*d* after focusing of the sensitivity curve adjustment gauge 136.

Further, the range adjustment of the dead zone of the analog stick 77 on the controller setting screen image 130 is implemented by adjusting the value suggested by the dead zone adjustment gauge 138 (particularly, the position of the slider). The value suggested by the dead zone adjustment gauge 138 can be adjusted by operating the R2 button 84*a* or the L2 button 84*b* or by operating the left button 71*b* or the right button 71*d* after focusing of the dead zone adjustment gauge 138. Further, long press of a button is recognized as that the button is pushed continuously.

In the present modification, in a case where long press of the R1 button 83a or the L1 button 83b on the controller setting screen image 130 is detected, the setting screen image generation section 118 slows down the change of the value suggested by the sensitivity curve adjustment gauge 136 in comparison with that in an ordinary frame work of the information processing device 10. On the other hand, in a case where long press of the R2 button 84a or the L2 button 84b on the controller setting screen image 130 is detected, the setting screen image generation section 118 slows down the change of the value suggested by the dead zone adjustment gauge 138 in comparison with that in an ordinary frame work of the information processing device 10.

In particular, in a case where the R1 button 83a or the L1 button 83b is long pressed on the controller setting screen image 130, the setting screen image generation section 118 slows down the change of the position of the slider (moving speed of the slider) of the sensitivity curve adjustment gauge 136 in comparison with that in a case where another button (here, the left button 71b or the right button 71d) is long pressed. On the other hand, in a case where the R2 button 84a or the L2 button 84b is long pressed on the controller setting screen image 130, the setting screen image generation section 118 slows down the change of the position of the slider (moving speed of the slider) of the dead zone adjustment gauge 138 in comparison with that in a case where another button (here, the left button 71b or the right button 71d) is long pressed.

For example, in a case where the R1 button 83a or the L1 button 83b is long pressed, the setting screen image generation section 118 may recognize a greater number of graduations which becomes a unit of movement of the slider of the sensitivity curve adjustment gauge 136, in comparison with that in a case where another button is operated. In particular, in a case where the left button 71b or the right button 71d is long pressed, the length of one graduation may be recognized as a length when the sensitivity curve adjustment gauge 136 is divided into 15, but in a case where the R1 button 83a or the L1 button 83b is long pressed, the length of one graduation may be recognized as a length when the sensitivity curve adjustment gauge 136 is divided into 30. Specifically, in a case in which the R1 button 83a or the L1 button 83b is long pressed, the number of graduations may be recognized twice as much as normal. Although the period of time required for movement by one graduation of the slider is not different for pressing any button, in a case where the R1 button 83a or the L1 button 83b is long pressed, the moving speed of the slider is lowered. It is to be noted that this similarly applies also to the graduations of the dead zone adjustment gauge 138 in a case where the R2 button 84a or the L2 button 84b is long pressed.

Alternatively, in a case where the R1 button 83a or the L1 button 83b is long pressed, the setting screen image generation section 118 may set the time required for movement of the slider by one graduation of the sensitivity curve adjustment gauge 136 longer than that in a case where another button is operated. In particular, in a case where the left button 71b or the right button 71d is long pressed, the time required for movement of the slider by one graduation may be set to A and in a case where the R1 button 83a or the L1 button 83b is long pressed, the period of time required for movement of the slider by one graduation may be set to A/2. This similarly applies also to the period of time required for movement of the slider by one graduation in a case where the R2 button 84a or the L2 button 84b is long pressed.

According to the present modification, it can be suppressed that the change in sensitivity by an operation of the R1 button 83a and the L1 button 83b becomes excessively steep. Further, it can be suppressed that the change of the dead zone by an operation of the R2 button 84a and the L2 button 84b becomes excessively steep. Consequently, the usability of the controller setting screen image 130 can be enhanced.

Another modification will be described. Although, in the working example, the magnitude of the operation recognized by the information processing device 10 at the exit of the dead zone (namely, the system recognition operation amount) is 0, as a modification, the system recognition operation amount at the exit of the dead zone may be set to a value greater than 0 (for example, to 14% of the highest value of the system recognition operation amount). It can be regarded that the dead zone is a range in which the system recognition operation amount at the exit is fixed to a value determined in advance.

In the present modification, the operation determination section 113 of the information processing device 10 may derive a tilt amount for system input (namely, a system recognition operation amount) based on the tilt amount of the analog stick 77, even in a case where the tilt amount of the analog stick 77 is within the range of the dead zone. In a case where the tilt amount of the analog stick 77 is within the range of the dead zone, the operation determination section 113 may input operation information including information that the tilt amount is within the range of the dead zone to the App execution section 114 (in other words, to the application) together with the system recognition operation amount. The information indicating that the tilt amount is within the range of the dead zone may be information indicating that the system recognition operation amount included in the package should not be used in processing of the application.

A further modification will be described. The controller setting screen image 130 may further include an object for adjusting the tendency of the sensitivity of the analog stick 77. This object strengthens the tendency of the sensitivity of the analog stick 77 from that in an initial state in response to a user operation in a first direction and besides weakens the tendency of the sensitivity of the analog stick 77 from that in the initial state in response to a user operation in a second direction opposite to the first direction. This object is, in the present modification, the sensitivity curve adjustment gauge 136.

FIG. 7 depicts an example of a controller setting screen image. FIG. 7 depicts a left side region of the controller setting screen image 130. The setting state image 148 is not depicted. The sensitivity curve adjustment gauge 136 includes a slider for adjusting the tendency of the sensitivity determined in advance for a pattern of the sensitivity curve selected by the sensitivity pattern selection field 134 (hereinafter referred to as a "selection pattern"). A default position 137 is an initial position of the slider and is a position at which a tendency of the sensitivity determined in advance for a selection pattern, namely, a default sensitivity curve of the selection pattern, is to be designated.

In the sensitivity pattern selection field 134 of FIG. 7, a "Precise" pattern is selected. As indicated by an initial sensitivity curve 146 of FIG. 7, in the "Precise" pattern, the increase amount of the system recognition operation amount with respect to the increase amount of the user input operation amount (namely, the inclination of the adjustment sensitivity curve 144) is relatively moderate within a range equal to or greater than a first threshold value but smaller than a second threshold value (where the second threshold value>the first threshold value). On the other hand, in a range equal to or greater than the second threshold value, the increase amount of the system recognition operation amount with respect to the increase amount of the user input operation amount is relatively steep. In the "Precise" pattern, it is possible to precisely adjust the system recognition operation amount within a range equal to or greater than the first threshold value but smaller than the second threshold value.

As depicted in FIG. 7, the user can move the slider of the sensitivity curve adjustment gauge 136 in the rightward direction (in other words, in the positive direction) from the default position 137. The movement of the slider of the sensitivity curve adjustment gauge 136 in the rightward direction acts to increase the tendency of the sensitivity of the selection pattern (also can be regarded as a feature or a characteristic). The slider of the sensitivity curve adjustment gauge 136 can be moved by five stages in the maximum in the rightward direction from the default position 137, and the value of the sensitivity curve adjustment gauge 136 in a case where the slider is moved by five stages in the rightward direction is +5.

As the slider of the sensitivity curve adjustment gauge 136 moves more in the rightward direction, the tendency of the sensitivity of the selection pattern increases. For example, in the "Precise" pattern depicted in FIG. 7, the increase amount of the system recognition operation amount with respect to the increase amount of the user input operation amount (namely, the inclination of the adjustment sensitivity curve 144) gradually becomes moderate within the range equal to or greater than the first threshold value but smaller than the second threshold value (where the second threshold value>the first threshold value).

FIG. 8 also depicts an example of a controller setting screen image. FIG. 8 also depicts a left side region of the controller setting screen image 130. As depicted in FIG. 8, the user can move the slider of the sensitivity curve adjustment gauge 136 in the leftward direction (in other words, in the negative direction) from the default position 137. The movement of the sensitivity curve adjustment gauge 136 in the leftward direction acts to decrease the tendency of the sensitivity of the selection pattern (this can be regarded also as a feature or a characteristic). The slider of the sensitivity curve adjustment gauge 136 can be moved by five stages in the maximum in the leftward direction from the default position 137, and the value of the adjustment gate in a case where the slider is moved by five stages in the leftward direction is −5.

As the slider of the sensitivity curve adjustment gauge 136 moves more in the leftward direction, the tendency of the sensitivity of the section pattern decreases. For example, in the "Precise" pattern depicted in FIG. 8, the increase amount of the system recognition operation amount with respect to the increase amount of the user input operation amount (namely, the inclination of the adjustment sensitivity curve 144) gradually becomes steep within the range equal to or greater than the first threshold value but smaller than the second threshold value (where the second threshold value>the first threshold value). It is to be noted that that the tendency of the sensitivity of the selection pattern decreases can be regarded also as that the shape of the adjustment sensitivity curve 144 approaches a linear shape (namely, the inclination of the sensitivity curve is fixed).

In the sensitivity pattern selection field 134, the "Quick" pattern can also be selected. As described above, the "Quick" pattern is a pattern in which, even if the user input operation amount is small, the increase amount of the system recognition operation amount is so great that the user input operation amount reaches its upper limit quickly. When the "Quick" pattern is selected, as the slider of the sensitivity curve adjustment gauge 136 moves more in the rightward direction, the increase amount of the system recognition operation amount within a range within which the user input operation amount is small becomes greater, namely, the inclination of the adjustment sensitivity curve 144 becomes greater. On the other hand, when the "Quick" pattern is selected, as the slider of the sensitivity curve adjustment gauge 136 moves more in the leftward direction, the increase amount of the system recognition operation amount within a range with which the user input operation amount is small becomes smaller, namely, the inclination of the adjustment sensitivity curve 144 becomes smaller.

According to the information processing system 1 of the present modification, the controller setting screen image 130 can be provided which allows adjustment of the sensitivity curve to a desired one by such an intuitive operation that, in a case where the tendency of the sensitivity of the selection pattern is to be increased, the slider of the sensitivity curve adjustment gauge 136 is moved in the rightward direction, but conversely in a case where the tendency of the sensitivity of the selection pattern is to be decreased, the slider of the sensitivity curve adjustment gauge 136 is moved in the leftward direction. Owing to this, the convenience in controller setting can be enhanced.

Any combination of the working example and the modifications described above is also useful as an embodiment of the present invention. A new embodiment created by such combination has advantageous effects of the working example and the modifications which are used in combination. It can be understood by those skilled in the art that functions to be achieved by the constituent features described in the claims are implemented by a single component of the constituent features indicated by the working example and the modifications or by cooperation of them.

The technology of the present disclosure can be applied to a controller that includes an analog stick and a device or a system that sets a controller that includes an analog stick.

REFERENCE SIGNS LIST

1: Information processing system
4: Display device
6: Controller
10: Information processing device
77: Analog stick
116: Display controlling section
118: Setting screen image generation section
204: Profile storage section
206: Profile transmission section
210: Operation information transmission section
212: Profile updating section

The invention claimed is:

1. An information processing device capable of accepting operation information from a controller, comprising:
   a generation section that generates a setting screen image for the controller, wherein the controller comprises a plurality of buttons; and
   a display controlling section that causes a display device to display the setting screen image for the controller, wherein the controller includes an analog stick, and wherein the setting screen image is configured such that both a sensitivity and a dead zone of the analog stick are adjustable simultaneously by a user through adjacent ones of the buttons.

2. The information processing device of claim 1, wherein:
the setting screen image includes an object that suggests a value of the sensitivity or the dead zone of the analog stick, and
the generation section slows down, in a case where one of the adjacent buttons on the setting screen image is long pressed, a change of the value suggested by the object in comparison with that in a case where another button is long pressed.

3. The information processing device of claim 1, wherein the setting screen image includes an image that indicates both a sensitivity and a dead zone of the analog stick on a common scale.

4. The information processing device of claim 1, wherein an adjustment of the sensitivity for the analog stick is adjustable using a pair of sensitivity buttons, wherein the adjustment of the dead zone for the analog stick is adjustable using a pair of dead zone buttons, and wherein the pair of sensitivity buttons and the pair of dead zone buttons are juxtaposed on the controller.

5. The information processing device of claim 4, wherein the setting screen image includes an image of a sensitivity curve, and wherein operations of the information processing device further comprise:
adjusting the sensitivity using a first and second button of the pair of sensitivity buttons,
wherein the generation section adjusts the sensitivity curve of the image of the sensitivity curve leftwardly and decreases a curvature of the sensitivity curve in response to a selection of the first button, and
wherein the generation section adjusts the sensitivity curve rightwardly and increases the curvature of the sensitivity curve in response to a selection of the second button.

6. The information processing device of claim 4, wherein the setting screen image includes an image having a region that includes a plurality of concentric circles that indicate a magnitude of an operation of the analog stick from a stationary position in a plurality of stages and in which a first object indicative of a range of the dead zone and a second object indicative of the magnitude of an operation inputted to the analog stick by the user are disposed, and wherein operations of the information processing device further comprise:
adjusting the dead zone using a third and fourth button of the pair of dead zone buttons,
wherein the generation section adjusts the first object indicative of the range of the dead zone leftwardly and decreases the magnitude of the operation inputted to the analog stick in response to a selection of the third button, and
wherein the generation section adjusts the first object indicative of the range of the dead zone rightwardly and increases the magnitude of the operation inputted to the analog stick in response to a selection of the fourth button.

7. The information processing device of claim 1, wherein operations of the information processing device further comprise:
in response to the user tilting the analog stick, providing feedback to the controller in accordance with simultaneous adjustments made to the sensitivity and the dead zone of the analog stick.

8. A system comprising one or more computers and an information processing device capable of accepting operation information from a controller, and one or more storage devices storing instructions that are operable, when executed by one or more computers to cause the one or more computers to perform operations comprising:
generating a setting screen image for the controller, wherein the controller comprises a plurality of buttons; and
providing, for display, the setting screen image for the controller, wherein the controller includes an analog stick, and wherein the setting screen image is configured such that both a sensitivity and a dead zone of the analog stick are adjustable simultaneously by a user through adjacent ones of the buttons.

9. The system of claim 8, wherein:
the setting screen image includes an object that suggests a value of the sensitivity or the dead zone of the analog stick, and wherein generating the setting screen image slows down, in a case where one of the adjacent buttons on the setting screen image is long pressed, a change of the value suggested by the object in comparison with that in a case where another button is long pressed.

10. The system of claim 8, wherein the setting screen image includes an image that indicates both a sensitivity and a dead zone of the analog stick on a common scale.

11. The system of claim 8, wherein an adjustment of the sensitivity for the analog stick is adjustable using a pair of sensitivity buttons, wherein the adjustment of the dead zone for the analog stick is adjustable using a pair of dead zone buttons, and wherein the pair of sensitivity buttons and the pair of dead zone buttons are juxtaposed on the controller.

12. The system of claim 11, wherein the setting screen image includes an image of a sensitivity curve, and wherein operations of the system further comprise:
adjusting the sensitivity using a first and second button of the pair of sensitivity buttons, wherein adjusting the sensitivity comprises:
adjusting the sensitivity curve of the image of the sensitivity curve leftwardly and decreasing a curvature of the sensitivity curve in response to a selection of the first button; and
adjusting the sensitivity curve rightwardly and increasing the curvature of the sensitivity curve in response to a selection of the second button.

13. The system of claim 11, wherein the setting screen image includes an image having a region that includes a plurality of concentric circles that indicate a magnitude of an operation of the analog stick from a stationary position in a plurality of stages and in which a first object indicative of a range of the dead zone and a second object indicative of the magnitude of the operation inputted to the analog stick by the user are disposed, and wherein operations of the system further comprise:
adjusting the dead zone using a third and fourth button of the pair of dead zone buttons,
wherein adjusting the dead zone comprises:
adjusting the first object indicative of the range of the dead zone leftwardly and decreasing the magnitude of the operation inputted to the analog stick in response to a selection of the third button; and
adjusting the first object indicative of the range of the dead zone rightwardly and increasing the magnitude of the operation inputted to the analog stick in response to a selection of the fourth button.

14. The system of claim 8, wherein operations of the system further comprise:

in response to the user tilting the analog stick, providing feedback to the controller in accordance with simultaneous adjustments made to the sensitivity and the dead zone of the analog stick.

15. A computer-implemented method comprising:
causing display of a setting screen image for a controller, wherein the controller comprises a plurality of buttons;
causing display of the setting screen image for the controller on a display device, wherein the controller includes an analog stick, and wherein the setting screen image is configured such that both a sensitivity and a dead zone of the analog stick are adjustable simultaneously by a user through adjacent ones of the buttons; and
simultaneously adjusting the sensitivity and the dead zone of the analog stick based on input obtained from adjacent ones of the buttons.

16. The computer-implemented method of claim 15, wherein the setting screen image includes an image that indicates both a sensitivity and a dead zone of the analog stick on a common scale.

17. The computer-implemented method of claim 15, wherein an adjustment of the sensitivity for the analog stick is adjustable using a pair of sensitivity buttons, wherein an adjustment of the dead zone for the analog stick is adjustable using a pair of dead zone buttons, and wherein the pair of sensitivity buttons and the pair of dead zone buttons are juxtaposed on the controller.

18. The computer-implemented method of claim 17, wherein the setting screen image includes an image of a sensitivity curve, and further comprising:
adjusting the sensitivity using a first and second button of the pair of sensitivity buttons, wherein adjusting the sensitivity comprises:
adjusting the sensitivity curve of the image of the sensitivity curve leftwardly and decreasing a curvature of the sensitivity curve in response to a selection of the first button; and
adjusting the sensitivity curve rightwardly and increasing the curvature of the sensitivity curve in response to a selection of the second button.

19. The computer-implemented method of claim 17, wherein the setting screen image includes an image having a region that includes a plurality of concentric circles that indicate a magnitude of an operation of the analog stick from a stationary position in a plurality of stages and in which a first object indicative of a range of the dead zone and a second object indicative of the magnitude of an operation inputted to the analog stick by the user are disposed, and further comprising:
adjusting the dead zone using a third and fourth button of the pair of dead zone buttons, wherein adjusting the dead zone comprises:
adjusting the first object indicative of the range of the dead zone leftwardly and decreasing the magnitude of the operation inputted to the analog stick in response to a selection of the third button; and
adjusting the first object indicative of the range of the dead zone rightwardly and increasing the magnitude of the operation inputted to the analog stick in response to a selection of the fourth button.

20. The computer-implemented method of claim 15, further comprising:
in response to the user tilting the analog stick, providing feedback to the controller in accordance with simultaneous adjustments made to the sensitivity and the dead zone of the analog stick.

* * * * *